(12) United States Patent  
Akanabe et al.

(10) Patent No.: US 7,029,565 B2  
(45) Date of Patent: Apr. 18, 2006

(54) METHOD OF PRODUCING OPTICAL ELEMENT FORMING DIE

(75) Inventors: Yuichi Akanabe, Kunitachi (JP); Tomohide Mizukoshi, Hino (JP)

(73) Assignee: Konica Corporation, Tokyo (JP)

( * ) Notice: Subject to any disclaimer, the term of this patent is extended or adjusted under 35 U.S.C. 154(b) by 342 days.

(21) Appl. No.: 10/438,560

(22) Filed: May 15, 2003

(65) Prior Publication Data

US 2003/0218264 A1    Nov. 27, 2003

(30) Foreign Application Priority Data

May 24, 2002  (JP)  ............................. 2002-150102

(51) Int. Cl.  
C25D 1/00  (2006.01)

(52) U.S. Cl. ............................. 205/79; 205/205; 205/70
(58) Field of Classification Search ................ 205/67, 205/70, 114, 50, 79; 264/225, 2.5  
See application file for complete search history.

(56) References Cited

U.S. PATENT DOCUMENTS

| 3,671,406 A | * | 6/1972 | Mattia et al. ................ 205/114 |
| 4,394,341 A | * | 7/1983 | Wierschke .................. 264/225 |
| 5,723,037 A | * | 3/1998 | Herbert et al. ................ 205/67 |
| 5,770,120 A | * | 6/1998 | Kamihara et al. .......... 264/1.27 |
| 6,510,709 B1 | * | 1/2003 | Yamashita et al. ............ 65/385 |
| 6,578,283 B1 | * | 6/2003 | Nishi .......................... 33/706 |

FOREIGN PATENT DOCUMENTS

| JP | 2001-217099 A |   | 8/2001 |
| JP | 2001-217099 | * | 10/2001 |

* cited by examiner

Primary Examiner—Nam Nguyen  
Assistant Examiner—Luan V. Van  
(74) Attorney, Agent, or Firm—Frishauf, Holtz, Goodman & Chick, P.C.

(57) ABSTRACT

A method of producing a die for forming an optical element including; a positioning step to fix temporarily under the state wherein a plurality of members at least one of which has a die transfer surface are positioned with their connection surfaces being put to face each other, and an electroforming connection step to connect both members by forming an electroforming mold on a circumference of the connection surface under the state where the plural members are positioned.

18 Claims, 4 Drawing Sheets

FIG. 6(a)
FIG. 6(b)
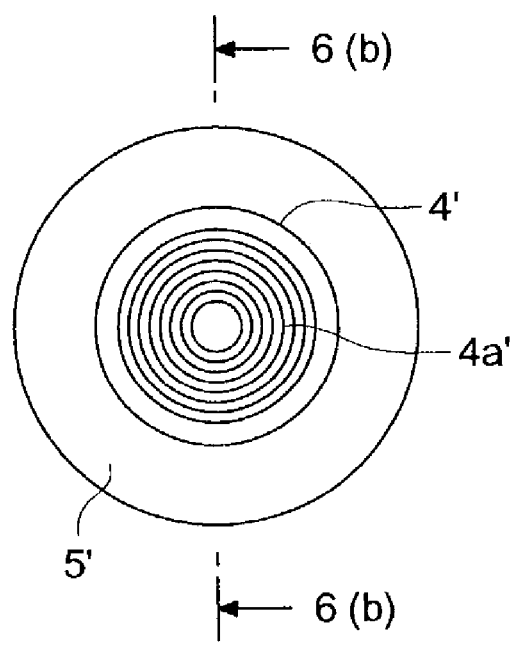
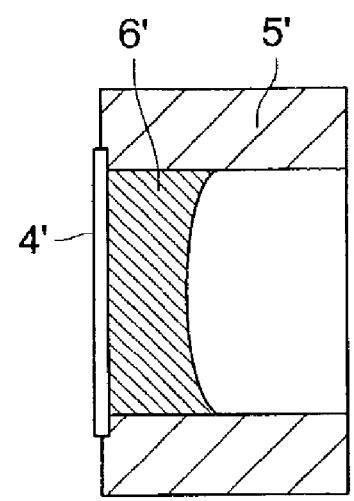

METHOD OF PRODUCING OPTICAL ELEMENT FORMING DIE

BACKGROUND OF THE INVENTION

The present invention relates to a method of producing an optical element forming die capable of molding an optical surface of an optical element, and in particular, to a method of producing an optical element forming die, the method being capable of connecting a plurality of members accurately when forming a die with the plural members.

In the field of an optical pickup device which has been developed rapidly in recent years, an optical element such as an objective lens having a super precision form is used. Further, an optical element having a microscopic pattern such as a diffraction grating has been developed. When an optical element like that is formed of a material such as plastic or glass by using a die, products in a uniform shape can be manufactured rapidly. Molding with a die is thus suitable for mass production.

Incidentally, in many cases, a die for molding an optical element is manufactured in a way that the die is cut one by one with, for example, a single crystal diamond tool. Under this condition, it is necessary to make a die to be small for the purpose of keeping the cost to be low, because a material of a die is expensive. Further, when machining a die while the die is rotating after being chucked on a cylindrical grinding machine, for example, it is preferable that a die is light in weight and small in size, for inhibiting machining errors caused by centrifugal whirling of the die. However, if a die is small, the die needs to be connected solidly with a supporting member for transmitting properly the pressing force for molding, when mounting the die on a molding apparatus. Under the aforementioned condition, when a microscopic pattern is formed on a die transfer surface, such microscopic pattern needs to be positioned accurately for the supporting member, on a micron order basis.

In this case, when connecting the die with the supporting member, there are considered some methods of connection including connection by means of bolts, bonding by means of an adhesive agent, thermal spraying and connection by means of a low-melting point alloy. However, when the die is connected with the supporting member through the connection by means of bolts, there is a fear that bolts are loosened by the temperature cycle resulting from molding or by repeating force during its service for a long time. On the other hand, when the die is connected with the supporting member by means of an adhesive agent, there is a fear that the sufficient adhesion strength cannot be kept under the high temperature ambient in the course of molding. Further, when the die is connected with the supporting member by means of thermal spraying, there is a fear that the die or the supporting member is deformed by the temperature in the course of thermal spraying. Furthermore, when the die is connected with the supporting member by melting the low-melting point alloy and by making it to solidify, there is a fear that the die or the supporting member is deformed by being exposed to melted alloy at high temperature, when the melting point is high, and sufficient adhesion strength of the alloy cannot be secured under the high temperature ambient in the course of molding, when the melting point is low. When the microscopic pattern stated above is formed on the die, in particular, the methods of connection mentioned above cause serious problems. When the optical element is formed finally, the optical functions by the microscopic pattern are seriously affected.

Although Japanese TOKKAI No. 2001-217099 discloses a method to produce a cavity for cyclotron by connecting two members through electroforming, there is no description about a method of positioning the two members before the electroforming.

SUMMARY OF THE INVENTION

The invention has been achieved in view of the problems stated above, and its object is to provide a method of producing a die, the method being capable of obtaining a highly reliable die, by connecting a plurality of members accurately.

The object stated above can be attained by either one of the following Aspects (1)–(6) of the method of producing a die.

Aspect (1): A method of producing a die for forming an optical element includes: a positioning step to fix temporarily a plurality of members, at least one of which has a die transfer surface, while the members are positioned to have respective connection surfaces facing each other, and an electroforming connection step to connect both members by forming an electrodeposited material on a circumference of the connection surfaces while the plural members are positioned.

Aspect (2): The method of producing a die for forming an optical element according to the aspect (1) above, further including: an electroforming step that conducts an electroforming process on a base having the die transfer surface and forms a die material on which the die transfer surface has been transferred, and a shaping step that shapes the die material through accurate mechanical processing. In this case, the aforementioned positioning step is conducted by fixing a supporting member on the die material shaped in the shaping step, and the electroforming connection step is conducted by forming the electrodeposited material on the circumference of the connection surfaces of the electroforming member and the supporting member.

Aspect (3): The method of producing a die for forming an optical element according to the aspect 2 above, wherein the electroforming connection step forms the electrodeposited material on the circumference of the connection surfaces of the die material and the supporting member when the supporting member is electrified.

Aspect (4): The method of producing a die for forming an optical element according to the aspect (2) above, wherein the supporting member is formed with a conductive member.

Aspect (5): The method of producing a die for forming an optical element according to the aspect (2) above, wherein the circumference of a connection portion having the connection surface is formed to be smaller in terms of a diameter than an outside diameter of the supporting member or of the die material other than the connection portion.

Aspect (6): The method of producing a die for forming an optical element according to the aspect (1) above, wherein the temporary fixing is conducted by putting the connection surfaces together with an adhesive in the positioning step, and circumferential grooves which allow the adhesive to escape are formed on at least one of the plural members.

Further, more preferable Aspects (7) to (23) as follows.

Aspect (7): A method of producing a die of the invention is, for example, a method of producing a die which produces a die for molding an optical element, by connecting a plurality of members at least one of which has a die transfer surface, wherein a plurality of members stated above are connected through electroforming. In the Aspect (7), an electrodeposited material is formed under the ambient condition close to a room temperature, and thereby, deformation of the aforementioned member is not caused, resulting in highly accurate connection, and sufficient connection strength is kept even under a high ambient temperature, and the connection is sufficiently resistant against the repeating force in the course of molding. Thus, it is possible to provide a die excellent in reliability, in comparison with connection by means of bolts, bonding by means of an adhesive agent, thermal spraying and joining by means of a low-melting point.

Incidentally, one of the aforementioned members may be a die having a die transfer surface, and as a material of this die, a metal and an amorphous material are conceivable. Further, one of the members stated above may be a supporting member which is connected with the die. On the die that is made of metal, there can be formed a die transfer surface corresponding to its optical surface and a microscopic pattern, through turning by the use of a diamond tool. If there exists a base corresponding to an optical element form, it is also possible to conduct transfer forming of a transfer surface including, for example, a microscopic pattern, by making an electrodeposited material to grow from that base. Even when one of the members to be connected to each other is not a conductive member, it is possible to conduct electroforming by forming a conductive film on that non-conductive member through electroless plating or vacuum evaporation. Further, it is also possible to form a die on which a microscopic pattern is transferred and formed accurately, by pressing melted amorphous material against the base to be solidified. Though it may be considered that a die having a length requiring no supporting member is formed totally, from electroforming and an amorphous material, it takes a long time to produce a die having a length including a cylinder-shaped driving portion, for example, because growth of an electrodeposited material takes a long time. Further, there is a problem that the cost of a die becomes extremely high, because amorphous material itself is expensive. Therefore, even when a die having a die transfer surface is formed with electroforming and amorphous material, it is necessary to connect with a supporting member when manufacturing cost and time are considered, thus, an effect of the invention is exhibited. In addition to this, silicone wafer and ceramic are considered as a material of a die. However, there is a fear that these materials are low in terms of toughness and they are not resistant to the repeating force.

Aspect (8): A method of producing a die to form a microscopic pattern on the die transfer surface stated above before the aforementioned member is connected. In the Aspect (8), an effect of the invention can be exhibited more because the microscopic pattern stated above and a member to be connected with a member having the die transfer surface are required to be positioned accurately.

Aspect (9): A method of producing a die wherein the die for molding an optical element is a die for injection molding.

Aspect (10): A method of producing a die wherein the aforesaid member is temporarily fixed under the condition that a connection surface of the member to be connected is put upon another to be positioned, and then, electrodeposited material is formed around the circumference of the connection surface. In the Aspect (10), it is possible to fix temporarily after positioning accurately and to connect while keeping that state, because heat and stress which worsen the positioning are not generated on the aforesaid member in the course of connection. Incidentally, there is an advantage that a structure for a temporary fixing is simplified when a connection surface is put upon the other connection surface. In this case, in particular, a period of time up to connection is short, and a die member having a length needed for injection molding can be made easily. In this case, "connection surface is put upon another" means that a connection surface is made to face the other connection surface directly or through a gap between them.

Aspect (11): A method of producing a die wherein a concave portion is formed on one of the connection surfaces to be put to face each other, and a projection is formed on the other surface, and the connection surfaces are positioned with each other when the projection is engaged with the concave portion. In the Aspect (11), accurate poisoning can be carried out.

Aspect (12): A method of producing a die wherein concave portions are formed on both of the connection surfaces to be put to face each other, and the connection surfaces are positioned with each other when the connection surfaces are put to face each other through an interposition (for example, a bar-shaped member that engages with the concave portion) which engages with both of the concave portions. In the Aspect (12), accurate poisoning can be carried out.

Aspect (13): A method of producing a die wherein the temporary fixing is carried out when the connection surfaces are bonded. In the Aspect (13), structures to hold the members are not required, which is preferable.

Aspect (14): A method of producing a die wherein at least one of the aforementioned plural members is composed of a conductive member, and a part on each of the connection surfaces is in direct contact with a part of others without an interposition of an adhesion layer. In the Aspect (14), wiring that is needed for electroforming can be simplified.

Aspect (15): A method of producing a die wherein the conductive member includes a metal.

Aspect (16): A method of producing a die wherein the temporary fixing is conducted when forces facing each other are given to the connection surfaces respectively.

Aspect (17): A method of producing a die wherein the force is given by the use of a mechanical means. In the Aspect (17), degree of adhesion between the connection surfaces is enhanced, which is preferable.

Aspect (18): A method of producing a die wherein the mechanical means includes a pair of planes arranged to face each other in the force transmitting path and a ball that is interpolated between both planes to be capable of rolling freely. In the Aspect (18), even when the force containing a component in the direction other than the original direction to give the force is generated, the force containing the component in this direction is not transmitted, thus, the force can be transmitted only in the original direction to give the force.

Aspect (19): A method of producing a die wherein the paired planes spread to be almost perpendicular to the force given to the plane.

Aspect (20): A method of producing a die wherein the mechanical means includes a tapered surface arranged in the transmitting path for the force and a ball that engages with the tapered surface. In the Aspect (20), the positional relationship between the ball and the plane side is not regulated if the ball is in slight touch up to immediately before touching or even after touching (under the assumption that the ball can slip on the plane), therefore, the connection surfaces can be made to be in close contact while the state where the connection surfaces are put to face each other is kept, by making the connection surfaces to be in the state to be put to face each other, by their own weight or by giving magnetic force or mechanical force separately only temporarily, and by increasing the force to be given.

Aspect (21): A method of producing a die wherein a plurality of members stated above are made of ferromagnetic material, and magnetic force generated by impressing a magnetic field on the ferromagnetic material is used to give the aforesaid force. Incidentally, the magnetic force mentioned in this case may be either a magnetic force with which a permanent magnet is generated or a magnetic force with which an electromagnet is generated.

Aspect (22): A method of producing a die wherein, after an adhesive agent is coated on both connection surfaces, the temporary fixing is conducted by giving forces in two directions facing each other. In the Aspect (22), the temporary fixing can be conducted more strongly.

Aspect (23): A method of producing a die wherein the connection surfaces are positioned each other before the temporary fixing is conducted. In the Aspect (23), when connection surfaces are put to face each other by adjusting intervals and positions under the condition that reference surfaces of both members, for example, reference surfaces represented by both end faces on the opposite sides of the connection surfaces of both members are held to be in parallel each other, it is effective when processing accuracy is hard to be improved, or accuracy of positioning at a stopper position is hard to be improved because of, for example, a small area of the connection surface. When an area of the connection surface is small, accuracy is easily affected by jammed foreign substances at a stopper position, but processing accuracy and positioning accuracy are easily secured because a rear end face and an outer circumference have a broad area in comparison with the connection surface, which is a merit. An outer circumferential surface may be a reference in place of a rear end face, but in this case, electroforming operations are easily conducted when the rear end face is held as a reference surface, which is a merit.

BRIEF DESCRIPTION OF THE DRAWINGS

Each of FIG. 1(a)

FIG. 6(a) is a front view of a die on which a cavity on the fixed side is structured, and FIG. 6(b) is a diagram in which a sectional view of the structure in FIG. 6(a) taken on line 6(b)–6(b) is viewed in the direction shown by the arrow.

DETAILED DESCRIPTION OF THE PREFERRED EMBODIMENT

Figure 1B:
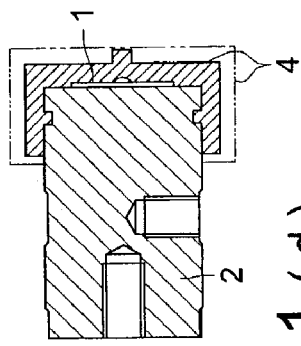
–FIG. 1(f) is a diagram showing a process to produce a die through electroforming.

A method of producing an optical element forming die relating to the embodiment of the invention will be explained as follows, referring to the drawings. Each of FIGS. 1(a)–1(f) is a diagram showing a part of a process for producing a die by electroforming. First, base 1 is attached to an end face of the jig 2 with a bolt(s) 3, as shown in FIG. 1. The base 1, which is made of silicon and has a microscopic pattern formed thereon, is formed via mechanical, chemical or physical processing. It is assumed that end face 2a of the jig 2 is accurately perpendicular to axial line X of the jig 2. Then, a nickel phosphorus film is formed on the surface of the base 1 by sputtering. The nickel phosphorus film protects the microscopic pattern, causes the base to be conductive, and improves a surface hardness of the die.

Further, in FIG. 1(b), an electrodeposited material of pure nickel is grown to turn out to be die material 4 as shown with two-dot chain lines. By conducting a process of coating an insulating agent on an outer circumferential surface of jig 2, it is possible to suppress adhesion of electrodeposited material on ares of the jig 2 where electrodeposited material is not desired. After the depositing, the die material 4 is shaped to have the form shown with solid lines in FIG. 1(b).

Figure 1D:
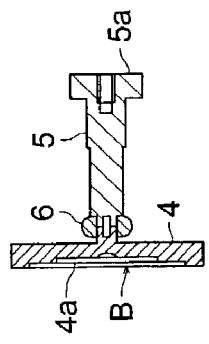
Figure 1F:
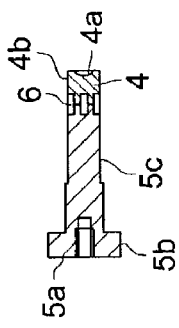
Figure 1A:
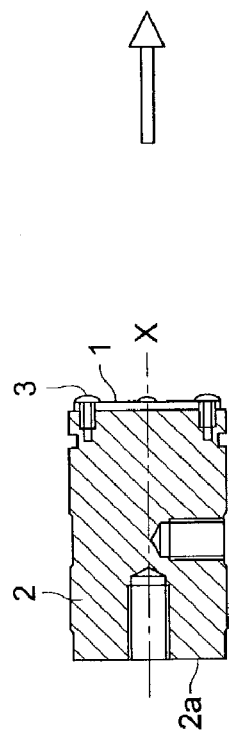
Figure 1C:
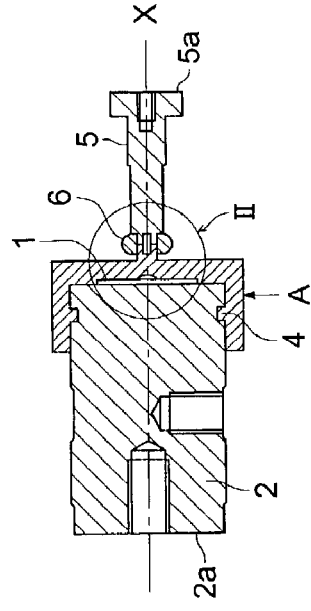
Figure 2:
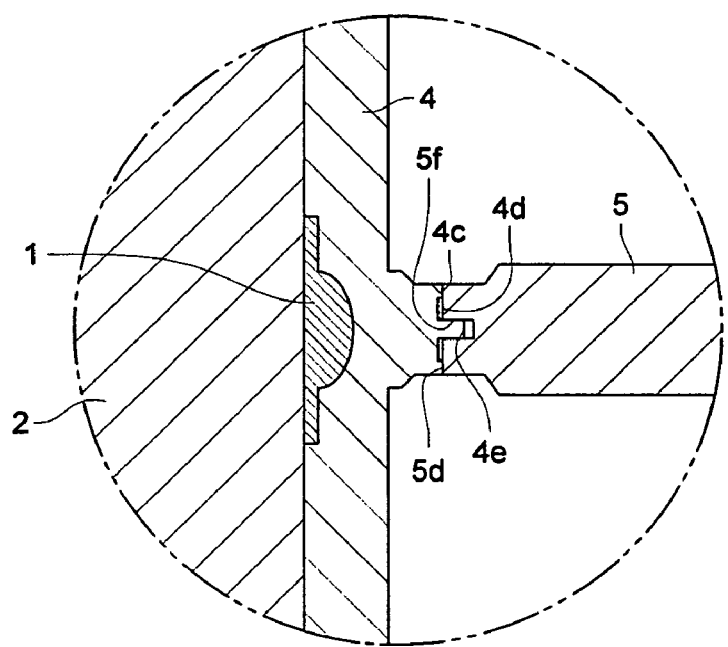
FIG. 2 is a diagram showing a part of a die material and a part of a supporting member by enlarging them.

After that, in FIG. 1(c), supporting member 5 formed of a conductive member is temporarily fixed on the die material 4. A structure for temporarily fixing the supporting member 5 will be explained in more detail. In FIG. 2, which is an enlarged view of the portion of FIG. 1(c) designated with arrow II, connection surface (connection portion) 4c of die 4 has projection 4e formed thereon at the center portion thereof and has groove (e.g. circular groove) 4d formed around the projection 4e. Connection surface (connection portion) 5d of supporting member 5 has opening 5f at a center portion thereof. Outer circumferences of connection surfaces (portions) 4c and 5d are reduced in terms of diameter with respect to the die material 4 and supporting member 5 to be ready for forming electrodeposited material.

That is, the circumference of the connection portion is formed to be smaller in terms of diameter than an outside diameter of the supporting member 5 or of the die material 4, as shown in FIG. 2. With this structure, the connection member 6, which is formed by a subsequent electroforming process, can be formed to be sufficiently thick, and the die material 4 and the supporting member 5 can be fixed firmly even when an outer circumferential surface of the connection portion is finished as shown in FIG. 1(f). By inserting the projection 4e in the opening 5f after coating an adhesive agent on the connection surface 4c or the connection surface 5d, the connection surfaces 4c and 5d are positioned. When the adhesive agent is solidified with the projection 4e inserted in the opening 5f, temporary fixing of the supporting member 5 on the die material 4 is completed. Since the adhesive agent can ooze out to the circular groove 4d in the course of positioning, the adhesive agent does not prevent the connection surface 4c around the circular groove from directly contacting the connection surface 5d. Inclination of the die material 4 with respect to the supporting member 5 and variation of the total length can thereby be suppressed. In addition, since electric contact is attained between the die material 4 and the supporting member 5, when the supporting member 5 is electrified in the course of forming an electrodeposited material at another portion (to be described later), the die material 4 is also electrified, which simplifies wiring. Incidentally, with respect to energizing, it is also possible to energize from the die material 4, without being limited to energizing from the supporting member 5. It is preferable that an adhesive agent having oozed out of the connection surface is removed. In the present embodiment, temporary fixing is conducted by the use of adhesive agents, so that an auxiliary tool for temporary fixing is unnecessary.

Then, an electrodeposited material is made to grow on the outer circumferential surface of the connection surface, to form connection member 6. When the connection member 6 is bridged to surround outer circumferences of the die material 4 and the supporting member 5, both of them are connected. In the present invention, at least one of members to be connected, especially, a member having a die transfer surface is formed with an electrodeposited material grown in advance (as described above with respect to die material 4). The electrodeposited material (e.g. the die material 4 as described above) formed in advance can be connected extremely firmly with a connection member formed by an electrodeposited material. Durability for its use as a die can thus be enhanced, and highly accurate connection corresponding to microscopic pattern formed on the die transfer surface can be carried out. The processing for suppressing the electrodeposited material is not wanted. After electroforming, washing is conducted sufficiently, and then, end face 5a of the supporting member 5 is machined with a plane grinding machine, using end face 2a of the jig 2 as a reference surface, to obtain prescribed parallelism. Accordingly, the end face 5a is also expected to be accurately perpendicular to axial line X. Further, the die material 4 is cut at the position designated by arrow A in FIG. 1(c) while rotating the jig 2, to separate the die material from the jig 2, to obtain the structure shown in FIG. 1(d). In this case, a microscopic pattern is assumed to have been transferred on face 4a of the die material 4 facing base 1. Incidentally, it is also possible to perform finishing work on an outer circumferential surface of the supporting member 5 before the separation, and to perform finishing work on the end face with the outer circumferential surface serving as a reference.

Figure 1E:
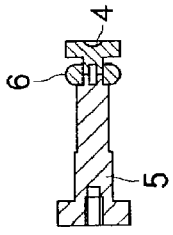

Further, rough finishing is conducted on the die material 4 by cutting at position B in FIG. 1(d) with a wire cutter or a milling machine while rotating the supporting member 5 to achieve the structure shown in FIG. 1(e). Finishing work is conducted on the outer circumferential surface of each of larger diameter portion 5b and smaller diameter portion 5c of the supporting member 5 by the use of a cylindrical grinding machine (or a precision lathe) with end face 5a of the supporting member 5 as a reference. Further, finishing work is conducted on each of outer circumferential surface 4b of the die material 4 and a circumferential surface of connection member 6 with end face 5a as a reference. In this case, it is preferable that a diameter of each of the outer circumferential surface 4b of the die material 4 and the circumferential surface of connection member 6 is the same as or slightly smaller than the outer diameter of small diameter portion 5c of the supporting member 5. The reason for this is that the connection member 6 formed by an electrodeposited material of pure nickel may disadvantageously be worn away in its early stage by repeated molding and may also disadvantageously generate heat, because the hardness of the connection member 6 is lower than that of the supporting member 5, which is made of steel. The die formed in this way is preferably used for injection molding.

Figure 3:
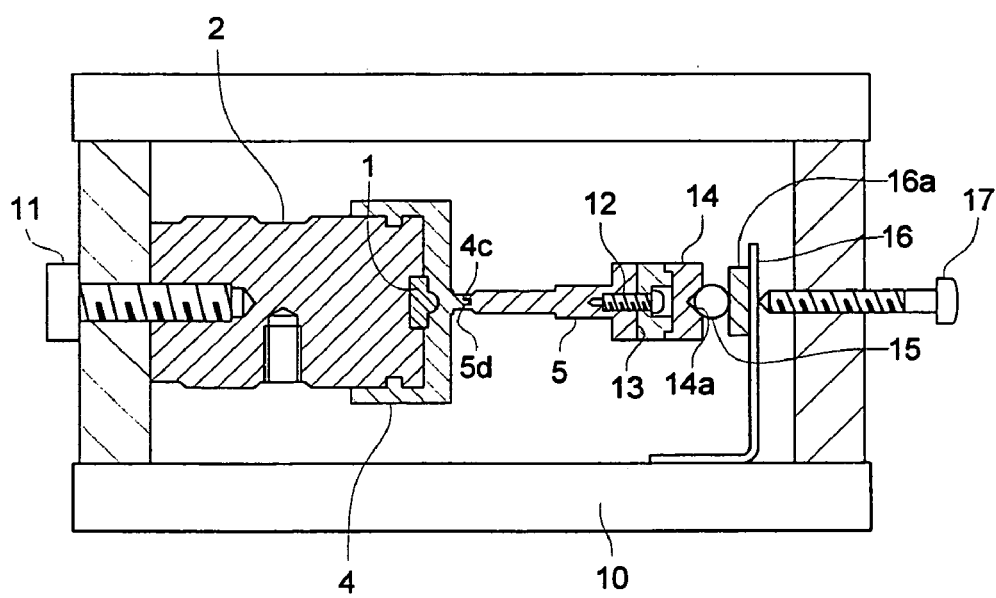
FIG. 3 is a diagram showing an apparatus to fix a die material on a supporting member temporarily.

FIG. 3 is a diagram showing a device to fix a die material on a supporting member temporarily. The device constitutes a mechanical means to give the force for fixing the die material on the supporting member temporarily. Since base 1, jig 2, die material 4 and supporting member 5 all shown in FIG. 3 basically have the structures identical to those shown in FIGS. 1(a) to 1(f) and 2, an explanation for them will be omitted here.

Jig 2 on which the formed die material 4 has been attached (see FIG. 1(b)) is fixed temporarily on frame 10 by the use of bolt 11, in FIG. 3. On the other hand, holder 13 is fixed on the end face of supporting member 5 with bolt 12, and further, the holder 13 is made to engage with taper member 14. Under this condition, projection 4e (FIG. 2) is inserted in opening 5f representing a concave portion (FIG. 2) to be to be fit while keeping connection surfaces 4c and 5d to face each other, thus, the die material 4 and the supporting member 5 are positioned each other. After that, sphere 15 is made to engage with tapered surface 14a of the taper member 14, and the sphere 15 is made to hit a plane of pad 16a. The pad 16a is supported by supporting member 16 to be variable in terms of position against the frame 10, and is pressed from the rear side by a tip of bolt 17 which is screwed in the frame 10.

When the bolt 17 is screwed in so as to advance, the pad 16a is pressed through the supporting member 16 to move toward the left side in FIG. 3. When the pad 16a is pressed, the sphere 15 presses the tapered surface 14a of the taper member 14, and presses the supporting member 5 through the holder 13, thus, the connection surface 4c comes into contact with the connection surface 5d while pressure force is mechanically applied to them. By conducting electroforming under this condition, the die material 4 and the supporting member 5 can be connected to each other by the use of connection member 6 that is formed by an electrodeposited material, as shown in FIG. 1(c). In the present embodiment, in which the tapered surface 14a and the sphere 15 contacting the tapered surface are included in a path to transmit the pressure force, even when the connection surfaces 4c and 5d are not in parallel with each other before the temporary fixing, the connection surface 5d can tilt when the connection surfaces are made to touch each other while the pressure force is applied. Thus, both connection surfaces 4c and 5d are made to come into close contact with each other, and the axial line of the supporting member 5 can be made to agree with that of the die material 4.

Figure 4:
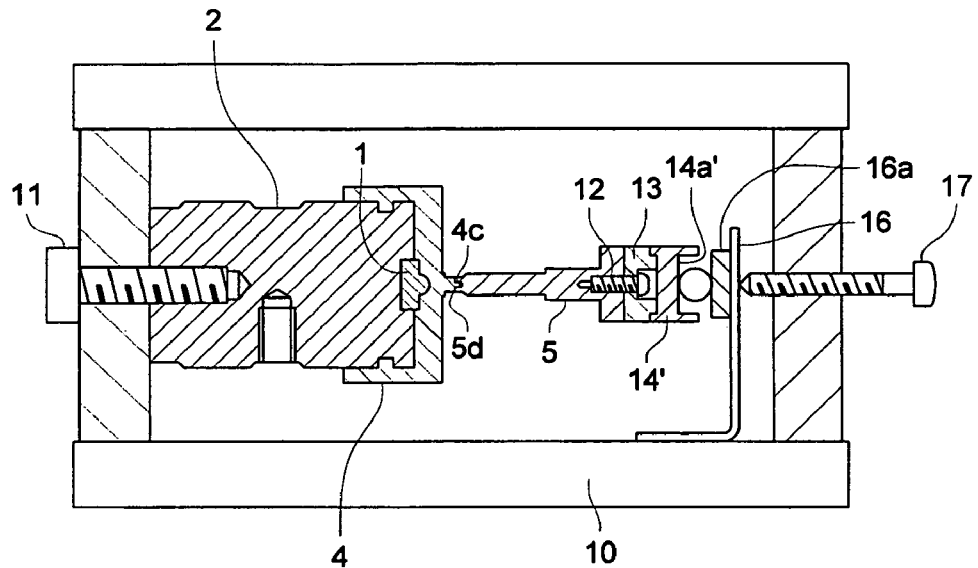
FIG. 4 is a diagram showing another apparatus to fix a die material on a supporting member temporarily.

FIG. 4 is a diagram showing another device to fix a die material on a supporting member temporarily. The device of this kind is also structured to be a mechanical means for giving the force for fixing the die material on the supporting member temporarily, and an explanation will be given only to the structures which are different from those in the device shown in FIG. 3.

In FIG. 4, parallel member 14' is fit in holder 13, and sphere 15 is arranged to be capable of turning freely between plane 14a' of the parallel member and a plane of pad 16a. When bolt 17 is screwed in so as to advance, pad 16a is pressed through supporting member 16 to move toward the left side in FIG. 4. When the pad 16a is pressed, the sphere 15 presses the plane 14a' of the parallel member 14' and presses supporting member 5 through the holder 13. Thus, the connection surface 4c comes into contact with the connection surface 5d while pressure force is mechanically applied to them.

Strictly speaking, even when bolt 17 is screwed in so as to advance, pad 16a conducts a circular arc movement. It is therefore possible that the force applied to spere 15 from pad 16a will include a component in a direction other than the axial direction along which the pressure force is to be applied. However, in the present embodiment, the sphere 15 can turn between plane 14a' of the parallel member 14' and a plane of pad 16a. The transmission of the force in the direction other than the axial direction can therefore be inhibited. Thus, both connection surfaces 4c and 5d are made to come into close contact with each other, and the axial line of the die material 4 and that of the supporting member 5 can be made to agree.

Figure 5:
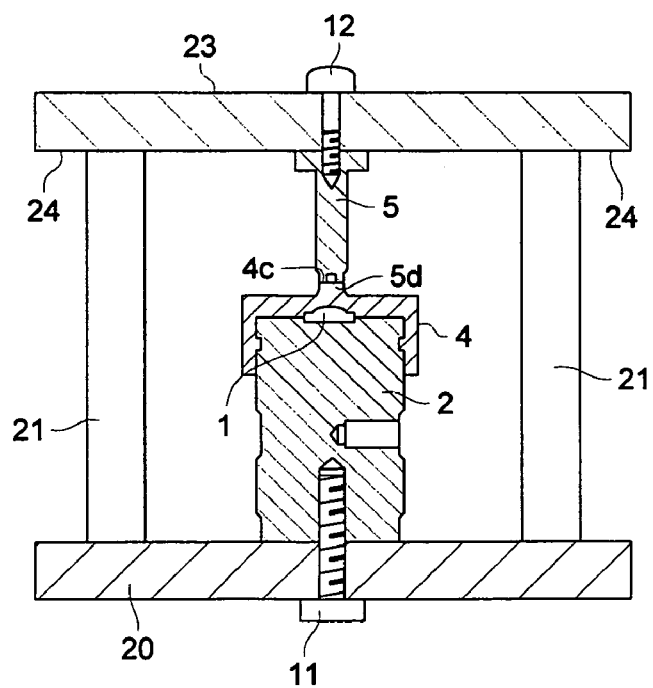
FIG. 5 is a diagram showing still another apparatus to fix a die material on a supporting member temporarily.

FIG. 5 is a diagram showing still another device to fix a die material on a supporting member temporarily. The device of this kind is also structured to be a mechanical means for giving the force for fixing the die material on the supporting member temporarily, and an explanation will be given only to the structures which are different from those in the device shown in FIG. 3.

Jig 2 on which the formed die material 4 has been attached (see FIG. 1(b)) is fixed temporarily on base board 20 on which a plurality of stays 21 are embedded by the use of bolt 11, in FIG. 5. On the other hand, panel 23 is fixed on the end face of supporting member 5 by the use of bolt 12. Under this condition, projection 4e (FIG. 2) is inserted in opening 5f (FIG. 2) to be engaged while keeping connection surfaces 4c and 5d to face each other, thus, the die material 4 and the supporting member 5 are positioned each other. In this case, parallelism between the base board 21 and panel 23 is kept by inserting thin shim 24 between upper ends of plural stays 21 and panel 23. Processing steps after this are the same as those in the aforementioned embodiment, and an explanation for them will be omitted accordingly.

Though the die described above constitutes a core on the movable side, a die constituting a cavity on the fixed side can also be made by applying the present embodiment. However, some dies are formed to be thin. In this case, how to install on the molding apparatus is a problem.

FIG. 6(a) is a front view of a die having a cavity on the fixed side, and FIG. 6(b) is a diagram in which the structure shown in FIG. 6(a) is cut on line 6(b)–6(b) and is viewed in the direction shown with the arrow. Thin-plate-shaped die material 4' is fixed temporarily on the end face of cylindrical supporting member 5', and then, both of them are fixed to each other by connection member 6' that is formed by an electrodeposited material that is grown from the reverse side of die material 4'.

The die having a cavity on the fixed side does not require a side surface, but it requires a certain thickness so that it can withstand pressure in the course of molding. However, its thickness is required to be 1 mm or less in a thin plate in many cases, for the reasons of process and cost, when forming microscopic pattern (for example, ring-shaped groove) 4a' on a semiconductor wafer as die material 4'. According to the embodiment shown in FIGS. 6(1) and 6(b), die material 4' and supporting member 5' can be connected by an electrodeposited material, and can be used as a die having the cavity on the fixed side.

The invention has been explained in detail, referring to the embodiment, and it is natural that the invention is not construed to be limited to the aforementioned embodiment, and modification and improvement can be made properly within a scope and spirit of the invention. For example, when putting connection surfaces to face each other, it is also possible to conduct positioning for them by inserting bar-shaped members (pins or the like) formed on the connection surfaces on both sides into concave portions formed on both sides, although projections formed on the connection surface on one side are made to fit in concave portions (openings) formed on the surface on the other side, in the embodiment. Further, by forming a supporting member with ferromagnetic material, it is also possible to give the force for making the both connection surfaces to come into close contact with each other, by attracting the die material made of pure nickel with magnetic force. Both of adhesion and pressing force may also be employed for the connection surfaces.

The invention makes it possible to provide a method of producing a die which can connect a plurality of members accurately and produce a highly reliable die.

What is claimed is:

1. A method of producing a die for forming an optical element, comprising:

forming an electrodeposited material on a base having a die transfer surface to form a die material, on which the die transfer surface has been transferred from the base, from the electrodeposited material;

forming a connection portion on the die material to be connected with a connection portion provided on a supporting member;

fixing temporarily the connection portion of the die material on the connection portion of the supporting member, while positioning the connection portions so as to face each other; and connecting the die material with the supporting member by forming an electrodeposited material on circumferences of the connection portions while positioning the die material and the supporting member.

2. The method of claim 1, wherein the electrodeposited material is formed on the circumferences of the connection portions of the die material and the supporting member while electrifying the supporting member.

3. The method of claim 1, wherein the supporting member comprises a conductive member.

4. The method of claim 1, wherein a diameter of the connection portion of the die material is smaller than the die material other than the connection portion, and a diameter of the connection portion of the supporting member is smaller than a diameter of the supporting member other than the connection portion.

5. The method of claim 1, wherein the connection portions are temporarily fixed by adhering the connection portions together with an adhesive; and wherein at least one of the die material and the supporting member comprises a circumferential groove to capture escaped adhesive.

6. The method of claim 1, further comprising:

forming a microscopic pattern on the die transfer surface on the base before forming the electrodeposited material thereon.

7. The method of claim 1, wherein the die is an injection molding die.

8. The method of claim 1, wherein a first one of the connection portions comprises a projection, and a second one of the connection portions comprises a concave portion into which the projection is inserted to position the connection portions.

9. The method of claim 1, wherein the connection portions comprise concave portions which are engaged via an interposition.

10. The method of claim 3, wherein the conductive member includes a metal.

11. The method of claim 1, wherein the connection portions are temporarily fixed by applying force thereto along an axial direction while the connection portions face each other.

12. The method of claim 11, wherein the force is applied by a mechanical device.

13. The method of claim 12, wherein the mechanical device comprises:

a pair of planes arranged to face each other in a force transmitting path; and a ball that is interposed between the pair of planes so as to be capable of rolling freely.

14. The method of claim 13, wherein the pair of planes are spread to be substantially perpendicular to the force applied by the mechanical device.

15. The method of claim 12, wherein the mechanical device comprises:

a tapered surface arranged in the force transmitting path; and a ball that engages with the tapered surface.

16. The method of claim 11, wherein the die material and the supporting member are made of ferromagnetic material, and a magnetic force generated by impressing a magnetic field on the ferromagnetic material is used to apply the force to the connection portions.

17. The method of claim 1, wherein the connection portions are temporarily fixed by applying the force in two directions facing each other after coating an adhesive on the connection portions.

18. The method of claim 1, wherein the positioning is performed before the temporary fixing is performed.

* * * * *